United States Patent Office 3,322,690
Patented May 30, 1967

3,322,690
SYNTHETIC CRYSTALLINE ZEOLITE COMPOSITIONS AND PREPARATION THEREOF
Julius Philip Bilisoly, Baton Rouge, La., assignor to Esso Research and Engineering Company, a corporation of Delaware
No Drawing. Filed Dec. 10, 1963, Ser. No. 329,366
18 Claims. (Cl. 252—455)

This invention relates to a process for preparing synthetic crystalline zeolites and the products thereby produced. Particularly, it relates to a process for preparing synthetic crystalline alumino-silicate zeolite containing a minor proportion of an inorganic metal oxide, said metal oxide being introduced into the reaction mixture from which said zeolite is crystallized so as to be ultimately held within its crystal framework. More particularly, it relates to the use of such zeolite products in hydrocarbon conversion processes.

Crystalline alumino-silicate zeolites, commonly referred to as "molecular sieves," are well known in the art. They are characterized by their highly ordered crystalline structure and uniformly dimensioned pores, and are distinguishable from each other on the basis of composition, crystal structure, adsorption properties and the like. The term "molecular sieves" is derived from the ability of these zeolite materials to selectively adsorb molecules on the basis of their size and form. The various types of molecular sieves may be classified according to the size of the molecules which will be rejected (i.e. not adsorbed) by a particular sieve. U.S. Patents Nos. 3,013,982–86 describe a number of these synthetic zeolites, designated therein as Zeolite A, D, L, R, S, T, X and Y. In addition to their extensive use as adsorbents for hydrocarbon separation processes and the like, it has recently been found that crystalline alumino-silicate zeolites, particularly after cation exchange to reduce alkali metal oxide content, are valuable catalytic materials for various processes, particularly hydrocarbon conversion processes.

In general, the chemical formula of the anhydrous crystalline alumino-silicate zeolites within the purview of the present invention expressed in terms of moles may be represented as:

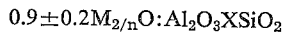

$$0.9 \pm 0.2 M_{2/n}O : Al_2O_3 \cdot XSiO_2$$

wherein M is selected from the group consisting of hydrogen, monovalent and divalent metal cations and mixtures thereof; $n$ is its valence, and X is a number from about 1.5 to about 12, said value being dependent upon the particular type of zeolite. The zeolite as produced or found naturally normally contains an alkali metal such as sodium or an alkaline earth metal such as calcium. Among the well-known natural zeolites are mordenite, faujasite, chabazite, gmelinite, analcite, erionite, etc. Such zeolites differ in structure, composition, and particularly in the ratio of silica to alumina contained in the crystal lattice structure. Similarly, the various types of synthetic crystalline zeolites, e.g. synthetic faujasite, mordenite, etc., will also have varying silica to alumina ratios depending upon such variables as composition of the crystallization mixture, reaction conditions, etc. For the synthetic faujasite type, X in the above formula has a value of from about 2 to about 7, preferably 5.0 to 5.5; for the synthetic mordenite type, X has a value of from about 8 to about 12, preferably 9.5 to 10.5; and for the "Zeolite A" type, X has a value of about 1.5 to about 5, preferably 1.9 to 3.

In the zeolites prepared by known procedures, the cation represented by M in the above formula will usually be a monovalent alkali metal cation, e.g. sodium, lithium or potassium cation. Of the latter, sodium cation will be especially preferred. Additionally, the cation M can be partially or completely exchanged by conventional ion-exchange techniques with a variety of monovalent and divalent cations. Preferred replacement cations will include hydrogen, ammonium, calcium, and magnesium cations.

The processes for producing such crystalline synthetic zeolites are well known in the art. Typically, they involve crystallization from reaction mixtures containing: $Al_2O_3$ as sodium aluminate, alumina sol and the like; $SiO_2$ as sodium silicate and/or silica gel and/or silica sol; alkali metal oxide, e.g. sodium hydroxide, either free or in combination with the above reactants; and water. Careful control is kept over the alkali metal oxide concentration of the mixture, the proportions of silica to alumina and alkali metal oxide to silica, the crystallization period, etc., to obtain the desired product. For example, a typical procedure for preparing crystalline sodium alumino-silicate zeolites is as follows:

Colloidal silica or silica hydrosol is mixed with a solution of sodium hydroxide and sodium aluminate at ambient temperatures to produce a reaction mixture having the desired molar ratios of reactants depending upon the particular type of zeolite to be produced. The reaction mixture may then be allowed to digest at ambient temperature for periods of up to 40 hours or more, preferably about 1 to 15 hours, in order to aid crystallization. It is then heated at 180° to 250° F., e.g. 200° to 220° F., for a sufficient period to crystallize the product, e.g. up to 200 hours or more, preferably 6 to 72 hours. The crystalline, sodium alumino-silicate zeolite is separated from the aqueous mother liquor by decantation or filtration and washed to recover a crystalline product.

The above procedure is utilized for the production of zeolites having the synthetic faujasite structure utilizing appropriate reactant mole ratios as described, for example, in U.S. Patent Nos. 2,882,244 and 3,013,988. By alteration of the reactant mole ratios, it may also be used for the preparation of zeolites having silica to alumina mole ratios of about 2.0. This type of zeolite is described, for example, in U.S. Patent No. 2,882,243 and designated therein as "Zeolite A." A somewhat altered procedure, performed at elevated temperature and pressure, may be used to produce zeolites having the synthetic mordenite structure as described, for example, in the Journal of the Chemical Society (1948), pp. 2158–2163.

The present invention is concerned with the discovery that inclusion of a minor proportion of an inorganic metal oxide in the reaction mixture prior to crystallization of the zeolite will produce an improved zeolite product. For example, it has been found that the high temperature stability of the zeolite product is markedly improved by the inclusion of the metal oxide, thereby enhancing its value and utility in such processes as gas drying, hydrocarbon conversion processes, etc. Furthermore, when these modified zeolites are used as hydrocarbon conversion catalysts or catalyst bases (e.g. in catalytic cracking, hydrocracking, isomerization, etc.), the resulting catalytic activity and product selectivity characteristics have also been found to be significantly improved.

The process of the present invention and the products thereby produced should be clearly distinguished from prior art products and processes. The process herein contemplated involves inclusion of the inorganic metal oxide ingredient in the reaction mixture prior to crystallization of the zeolite, so as to ultimately obtain a modified zeolite product having a minor proportion of said metal oxide retained by or held within its crystal framework. The zeolite product of the present invention is thus formed from a reaction mixture which is similar to those previously described except for the presence of a minor amount of the inorganic metal oxide ingredient at the time the crystallization of the zeolite is initiated. When the final zeolite product is crystallized, the inorganic metal oxide ingredient is already contained within its crystal framework prior to its physical separation from the mother liquor. This procedure is to be clearly distinguished from modification of the crystallized zeolite product subsequent to its formation using such well-known techniques as metal impregnation or deposition, ion exchange, etc. For example, prior art zeolite products which have been conventionally base-exchanged with various metal cations may very well contain many of the metals herein contemplated. However, such products may characteristically be further exchanged to preferentially replace these metal cations. The products of the present invention, however, are characterized by their resistance to such subsequent replacement of the metal oxide ingredient. Thus, for example, in a particular embodiment of the present invention, subdivided magnesium oxide is included in the reaction mixture prior to crystallization of the zeolite. The final crystallized zeolite product contains a minor proportion of water-insoluble magnesium oxide which is tenaciously held within its crystal framework and is relatively difficult to remove, either by water washing or by ion exchange with metal cation solutions. This is to be distinguished from conventional ion exchange treatment of zeolites with a magnesium ion solution. In this case, the magnesium ion can be removed by subsequent ion exchange with a more readily exchangeable cation.

As mentioned, an important difference between the present process and prior art processes resides in the incorporation of the inorganic metal oxide ingredients directly into the reaction mixture from which the zeolite is crystallized. This metal oxide ingredient is utilized in a subdivided, essentially pure solid form or in a chemically combined form that is readily decomposable to said pure solid form at a temperature below the temperature of the crystallization step, e.g. below 210° F. This feature is to be clearly distinguished from the conventional inclusion in the reaction mixture of the various metallic oxide reactants hereinbefore described which form the actual zeolite crystal structure. In these conventional procedures these metal oxides in the reaction mixture (i.e. $Na_2O$, $SiO_2$, $Al_2O_3$) react to form the inherent crystal structure of the zeolite. In the present process, however, discrete particles of powdered inorganic metal oxide are suspended in the reaction mixture at a time prior to crystallization of the zeolite product, which particles, upon crystallization, become tenaciously held within the zeolite crystal framework. It is this characteristic which is believed to be responsible for the improved stability and activity of the zeolite products thereby produced. For purposes of clarity, throughout the specification and claims, the inorganic metal oxide will be referred to as an "ingredient" so as to distinguish from the above "reactants."

The products of the present invention are also to be clearly distinguished from known compositions comprising crystalline zeolite embedded in a major proportion of amorphous gel material. These materials have been found to be valuable in various hydrocarbon conversion processes, particularly in fluidized bed operations. Again, such materials are produced by subsequent treatment of the zeolite; that is, treatment subsequent to its crystallization. In this instance the crystallized zeolite may be combined with a suitable amorphous gel by any one of a number of means. For example, the separated and dried zeolite crystals may be simply slurried in the gel and the mixture spray dried. Alternatively, the gel may be added to the crystallization mixture containing already-crystallized zeolite and mother liquor and the entire mass spray dried to form the final composition. The products of the present invention may, of course, be further modified by similar treatments.

The novel products of the present invention may thus aluminosilicate zeolites having the chemical formula hereinbefore set forth and containing a minor amount of a substantially water-insoluble inorganic metal oxide held within its crystal framework. As hereinbefore mentioned, the zeolite product is produced from reaction mixtures similar to those of the prior art except for the presence of a subdivided inorganic metal oxide at the time crystallization of the zeolite is initiated. Generally, the amount of said metal oxide which is incorporated into the final product should be sufficient to impart improved high temperature stability to the crystal framework. More specifically, the amount of said inorganic metal oxide in the final product may be about 1 to about 20 wt. percent, preferably 2 to 12 wt. percent, most preferably 3 to 6 wt. percent.

A variety of metal oxides may be utilized in the present invention with a requirement being that the metal oxide chosen be capable of imparting improved high temperature stability to the final zeolite product. Preferred metal oxides will include the oxides of metals in the Lanthanum Series, i.e. the rare earth metals, and metals in Groups II and IV of the Periodic Table. Examples of such metals include magnesium, calcium, silicon, beryllium, cerium, and lanthanum, with magnesium being particularly preferred. However, other metals will also be suitable; for example, zinc, aluminum, boron and lithium. Combinations of these metal oxides can also be used. The metal oxide ingredient is preferably added to the reaction mixture in the solid state, but can also be added in a form that is readily decomposable to the solid state at a temperature below the crystallization temperature.

In accordance with the present invention, crystalline alumino-silicate zeolites are prepared from reaction mixtures containing four principal reactants and a minor amount of an inorganic metal oxide ingredient. The four principal reactants are similar to those used in the conventional preparation procedures; i.e. alkali metal oxide (e.g. $NaO_2$, silica ($SiO_2$), alumina ($Al_2O_3$), and water ($H_2O$), which reactants are supplied by suitable source materials as hereinbefore described.

For example, a synthetic faujasite may be prepared using typical reactant proportions determined from the following molar ratios:

TABLE I

| | General | Preferred | Particularly Preferred | Specific |
|---|---|---|---|---|
| $SiO_2/Al_2O_3$ | 3–27 | 3–12 | 6–10 | 6–8 |
| $Na_2O/Al_2O_3$ | 1–11 | 1–4 | 2–4 | 2–3 |
| $H_2O/SiO_2$ | 3–30 | 3–20 | 6–12 | 7–10 |

It will be understood that the above ranges are merely typical values and are not to be construed as limiting. In addition to the above reactants, the substantially water-insoluble inorganic metal oxide ingredient is added either in a subdivided essentially pure solid form or in a chemically combined form that is readily decomposable to the essentially pure solid form at a temperature below the temperature of the crystallization step, e.g. below 210° F. The metal oxide ingredient may be added to the reaction mixture as a powder, subdivided gel, or as a chemical species which will readily decompose to the desired metal oxide so as to form discrete metal oxide particles prior to crystallization of the zeolite. The metal oxide should, of course, be in a sufficiently finely-divided state to be ultimately held within the zeolite crystal framework. It has been found preferable to slurry the metal oxide ingredient in one of the principal reactant source materials such as the alkali aluminate or silica sol. A sufficient amount of the metal oxide ingredient is added to produce a zeolite product having a composition within the aforementioned ranges. Upon crystallization, the metal oxide particles become firmly held within the crystalline zeolite framework.

For the preparation of a synthetic faujasite, the typical procedure hereinbefore described is used, except for the inclusion of the inorganic metal oxide ingredient. The crystallization process is usually terminated at the point of maximum crystallinity (as determined by periodic analysis) by quenching with excess water. The product is then separated from the reaction mixture by conventional solids separation techniques, e.g. filtration, centrifugation, etc., washed thoroughly, and dried at elevated temperature, e.g. 220 to 280° F. The product crystals, after separation from the mother liquor and thorough washing, may be activated by heating to elevated temperature, e.g. 300 to 450° C., to remove water of hydration and to produce a substantially anhydrous product which is suitable for use as an adsorbent and catalytic material.

A synthetic "Zeolite A" containing inorganic metal oxide may be prepared by following substantially the same procedure using molar ratios of reactants falling in either of the following ranges:

TABLE II

|  | Range 1 | Range 2 |
|---|---|---|
| $SiO_2/Al_2O_3$ | 0.5–1.3 | 1.3–2.5 |
| $Na_2O/Al_2O_3$ | 0.5–3.9 | 1.0–7.5 |
| $H_2O/SiO_2$ | 35–600 | 35–600 |

The proportion of the metal oxide ingredient will be the same as previously described for the synthetic faujasite preparation.

As a further illusrtation, a synthetic mordenite containing inorganic metal oxide may be prepared by crystallization of a mixture having the following molar ratios of reactants:

TABLE III $SiO_2/Al_2O_3$ ------------------------------------- 8–12
$Na_2O/Al_2O_3$ ------------------------------------- 1–3
$H_2O/SiO_2$ ------------------------------------- 3–75

The proportion of the inorganic metal oxide ingredient will be the same as previously described for the synthetic faujasite preparation. The crystallization step may be performed under pressure in a sealed vessel at a temperature of about 500 to 575° F. for a cystallization time of about 8 to 72 hours, with the pH of the reaction mixture being maintained above about 8, e.g. 8 to 10.5.

It should be understood that the scope of the present invention is not intended to be limited to any of the various types of crystalline alumino-silicate zeolites hereinbefore described. The discovery of the stabilizing effect of the metal oxide ingredient on the crystalline zeolitic framework and its beneficial effect upon the activity and selectivity of the zeolite when modified to form hydrocarbon conversion catalyst is pertinent to a wide variety of synthetic zeolites and preparation procedures. For example, the preparation of synthetic zeolites utilizing a quaternary ammonium compound of the formula $N(R)_4OH$, wherein R is an alkyl group, e.g. $N(CH_3)_4OH$, as a principal reactant in the crystallization mixture has been described in the art, e.g. Belgian Patent No. 615,311. Zeolites prepared by such procedures are also intended to be included within the scope of the present invention.

As previously indicated, in addition to their use as adsorbents, certain of the crystalline zeolites, particularly those having uniform pore openings of about 6 to about 15 angstrom units and silica to alumina ratios above about 3, e.g. 4 to 6, have been found to be valuable catalytic materials for hydrocarbon conversion processes. In such applications, e.g. catalytic cracking, base exchange with a metal cation or hydrogen-containing cation is usually desirable in order to reduce the alkali metal oxide content (e.g. $Na_2O$) to less than 10 wt. percent, preferably about 1 to 5 wt. percent, based on the weight of the zeolite crystals. The metal cation can be a metal of Groups I to VIII and the rare earth metals, but preferably is a member of the group consisting of Groups II, III, IV, V, VI–B, VII–B, VIII and rare earth metals. Among the particularly preferred metals for catalytic cracking catalyst purposes are the alkaline earth metals, especially magnesium and calcium. Ion exchange may be accomplished by slurrying the zeolite product with an aqueous solution of the desired cation at temperatures of about 60° to 150° F. to replace the alkali metal and washing the resulting base-exchanged material free of soluble ion prior to drying. Suitable solutions include, for example, solutions of magnesium sulfate, calcium chloride, barium chloride, iron sulfate, ammonium hydroxide, ammonium chloride, etc. Typical cracking conditions, which are well known in the art, include a temperature of about 750° to 1050° F., a pressure of atmospheric to about 100 p.s.i.g., etc.

Again, this subsequent ion exchange treatment which introduces a metal cation into the zeolite is to be clearly distinguished from the incorporation of the inorganic metal oxide ingredient into the reaction mixture prior to the crystallization of the zeolite in accordance with the present invention. In the case of subsequent ion exchange, the net result is to replace the alkali metal which is a constituent of the inherent crystal structure of the zeolite with another metal cation which is readily further exchangeable. The inorganic metal oxide ingredient, however, is relatively unaffected by ion exchange treatment. Thus, when a sodium alumino-silicate zeolite containing magnesium oxide as the inorganic metal oxide ingredient is subjected to catonic exchange, the metal cation will exchange only with the sodium ions and the magnesium will remain substantially unaffected.

In connection with the above-described modification of the zeolites to form cracking catalysts, the process of the present invention provides a further advantage not heretofore mentioned. It has been found that the "magnesium form" of these zeolites are particularly valuable and desirable cracking catalysts, and that the improved catalysts are obtained when at least 75% of the original sodium has been exchanged with magnesium. It is most desirable to maximize the magnesium content and minimize the sodium content. However, the magnesium exchange reaction has been found to proceed rather slowly, particularly as the sodium level decreases. Also, the reduction in sodium content per exchange is relatively small, and a large number of exchange treatments is required to reduce the $Na_2O$ level to below the equilibrium point, which is about 4% sodium. After this level is reached, the sodium and magnesium contents remain essentially constant unless the exchange temperature is substantially increased. As a result, the maximum magnesium oxide content achievable by conventional ion exchange treatment is only about 6 to 9 wt. percent, based on zeolite. By means of the present invention, however, a magnesium-containing zeolite is directly prepared by incorporation of magnesium oxide into the reaction mixture prior to crystallization of the zeolite. Upon subsequent magnesium ion exchange, the usual amount of ionic magnesium becomes incorporated into the zeolite and, together with the pre-incorporated solid magnesium oxide, results in a total magnesium content substantially higher than that attainable by known techniques. For example, total magnesium oxide contents of up to about 18 wt. percent are attainable by this two-step procedure involving pre-incorporation of magnesium oxide in the solid form, and subsequent incorporation of ionic magnesium by base exchange.

The ion-exchanged zeolites having reduced sodium content can be further modified for certain applications, such as hydrocracking, by impregnation with a suitable metal, e.g. a hydrogenating metal. For example, platinum group metals such as palladium, platinum and rhodium, or other metals such as molybdenum, chromium, vanadium, cobalt, nickel, copper, silver and manganese may be deposited on the base-exchanged crystalline alumino-silicate zeolite containing inorganic metal oxide. Preferably, the zeolites are first partially decationized by base exchange with ammonium ions and then treated with an appropriate metal salt or ammonium complex of the chloride of platinum or palladium. The amount of platinum group metal in the finished catalyst is generally between about 0.01 to 5.0 wt. percent, preferably 0.1 to 3.0 wt. percent, based on dry zeolite. Typical hydrocracking conditions include a temperature of about 550° to 1000° F., a pressure of about 200 to 3000 p.s.i.g., a feed rate of about 0.25 to 10 v./v./hr., and a hydrogen gas rate of about 750 to 25,000 s.c.f./b.

The zeolitic catalyst may be utilized for catalytic conversions in the above-described forms or may be suitably embedded in an amorphous material such as silica gel, or a cogel of silica and at least one other metal oxide, wherein the metal is selected from Groups II–A, III–A and IV–B of the Periodic Table, e.g. alumina, titania, magnesia, etc. The use of such composite materials has been found valuable in fluidized and moving bed operations since they may be readily formed into particles of a desired size. The composites may be formed by incorporating the zeolite crystals into a suitable hydrogel, e.g. silica-alumina hydrogel; subjecting the mixture to high agitation conditions with added water, if necessary, to produce a homogeneous fluid dispersion; and finally spray drying the resulting mixture. As previously indicated, this subsequent treatment, which involves incorporation of the crystallized zeolite product into a major proportion of an amorphous gel, is again to be distinguished from the process of the present invention which involves inclusion of a minor amount of an inorganic metal oxide in the reaction mixture prior to the crystallization of the zeolite so as to obtain a metal oxide-containing zeolite that exhibits improved high temperature and steam stability, and superior catalytic properties when modified to form a hydrocarbon conversion catalyst.

The invention will be further understood by the following examples, which are given for illustrative purposes only and are not intended to limit the scope of the invention.

*Example 1*

A crystalline sodium alumino-silicate zeolite of the synthetic faujasite type having pore openings of about 13 A. was prepared by the following procedure. A solution of 96 grams of commercial sodium aluminate (containing 38 wt. percent $Na_2O$, 38 wt. percent $Al_2O_3$, and 24 wt. percent $H_2O$), and 343.2 grams of 97% sodium hydroxide (75 wt. percent $Na_2O$), contained in 1229 grams $H_2O$, was added with stirring, at ambient temperature, to 2325.6 grams of a commercially available aqueous sol of colloidal silica containing 30 wt. percent $SiO_2$ ("Ludox" solution supplied by E. I. de Pont de Nemours & Co.) in which there had been previously slurried 12 grams of C.P. grade magnesium oxide (supplied by J. T. Baker Chemical Company). The reaction mixture was stirred until homogeneous and then heated to a temperature of about 212° F. over a period of about 6 hours, and aged at said temperature in a closed vessel for about 5½ days. At this point the zeolite product had sufficiently crystallized. It was then filtered, water washed until the wash water showed a pH of about 10, and dried at 212° F.

The above zeolite product was then stirred for 5 hours at room temperature with 3500 cc. of a 19% ammonium chloride solution to reduce its $Na_2O$ content. After water washing to remove excess chloride ion and calcination at a temperature below about 950° F., the finished product showed the following analysis: 71.5 wt. percent $SiO_2$, 19.4 wt. percent $Al_2O_3$, 3.84 wt. percent $Na_2O$, and 5.85 wt. percent MgO. The product had a silica-to-alumina mole ratio of 6.25:1, and exhibited the typical faujasite structure by X-ray diffraction analysis.

To test the high temperature stability and steam stability of the above product, some samples were aged at temperatures between 1000° F. and 1500° F., while other samples were contacted with steam at 1050° F. and 1200° F. The results of these stability tests are shown in the following table, and are expressed in terms of the crystallinity of each sample as compared to a standard synthetic faujasite sample taken as having a crystallinity of 100.

TABLE IV.—STABILITY OF CRYSTALLINE ZEOLITE CONTAINING MAGNESIUM OXIDE

| Heat Treatment | X-Ray Crystallinity (percent of Standard as 100) | Surface Area, $M^2/G$. | Pore Vol., CC/G. |
| --- | --- | --- | --- |
| 16 Hrs. at 1,000° F | 115 | 509 | 0.69 |
| 16 Hrs. at 1,400° F | 107 | 742 | 0.54 |
| 16 Hrs. at 1,500° F | 96 | 616 | 0.62 |
| Steamed 16 Hrs. at 1,050° F | 124 | 500 | 0.67 |
| Steamed 16 Hrs. at 1,200° F | 107 | 303 | 0.69 |

As shown above, the magnesium oxide-containing samples were extremely stable at these extreme conditions and retained their crystal structures to a high degree. Similar treatment of samples containing 0% magnesium oxide results in substantial decomposition under these extreme conditions. The improved stability of crystalline zeolite prepared from reaction mixtures containing an inorganic metal oxide which, upon crystallization, becomes contained within the zeolite crystal framework, is thus demonstrated.

*Example 2*

A crystalline zeolite having the "Zeolite A" structure with pore openings of about 13 A. is prepared by the typical procedure of Example 1, with the reaction mixture containing the following molar ratios of ingredients:

$SiO_2/Al_2O_3$ ------------------------------------ 1.3
$Na_2O/Al_2O_3$ ----------------------------------- 1.6
$H_2O/SiO_2$ ------------------------------------- 59

6 wt. percent, based on final product, of the magnesium oxide used in Example 1 is included in the colloidal silica sol reactant. The zeolite product exhibits improved high temperature stability.

*Example 3*

A crystalline sodium alumino-silicate zeolite containing amorphous zinc oxide was prepared by substantially the same procedure as Example 1, using a solution of 90.4 grams of the sodium aluminate solution, 360 grams of the sodium hydroxide, and 2248 grams of water, which solution was added to 6720 grams of the 30% silica sol in which there had been previously slurried 45 grams of zinc oxide powder (supplied by J. T. Baker Chemical Company). The final product exhibited a typical faujasite structure and had the following analysis: $SiO_2$, 64.7%; $Al_2O_3$, 20.4%; $Na_2O$, 12.4%; ZnO, 2.36%. It had a silica to alumina mole ratio of 5.4:1.

*Example 4*

The procedure of Example 3 was used to prepare a crystalline zeolite containing powdered calcium oxide. The following quantities of ingredients were used: 120 grams of the sodium aluminate solution, 373.8 grams of the sodium hydroxide solution, 1214 grams of water, 2574.5 grams of the silica sol, and 22.1 grams of calcium oxide. The final product showed the following analysis: 14.2 wt. percent $Na_2O$, 65.5 wt. percent $SiO_2$, 15.0 wt. percent $Al_2O_3$, and 5.6 wt. percent CaO.

*Example 5*

The procedure of Example 3 is repeated with the exception that finely pulverized silica-alumina is utilized in place of the zinc oxide. A crystalline sodium aluminosilicate zeolite having silica-alumina held within its crystal framework is produced.

*Example 6*

The procedure of Example 3 is repeated exactly except that lithium oxide is utilized in place of the zinc oxide.

Example 7

The procedure of Example 3 is repeated exactly except that beryllium oxide is used in place of the zinc oxide.

Example 8

The procedure of Example 3 is repeatedly exactly except that cerium oxide is utilized in place of the zinc oxide.

Example 9

The procedure of Example 3 is repeated exactly except that lanthanum oxide is utilized in place of the zinc oxide.

Example 10

To illustrate the use of the zeolite products of the present invention in catalytic cracking operations, a synthetic crystalline sodium alumino-silicate zeolite containing magnesium oxide was prepared by the procedure of Example 1 using the same reactant proportions. After crystallization, filtration and washing, the product was base-exchanged three times with magnesium sulfate solution. Each treatment was performed for a period of about an hour using a solution of 143 grams of $MgSO_4 \cdot 7H_2O$ in 2236 cc. $H_2O$. In this manner the sodium content of the zeolite was reduced by exchange with magnesium ions. After washing, drying, and calcining, the product showed the following analysis: 4.3 wt. percent $Na_2O$, 12.0 wt. percent MgO (of which about 6% represents the pre-incorporated material), 66.9 wt. percent $SiO_2$, and 15.0 wt. percent $Al_2O_3$. By X-ray analysis the product exhibited the typical faujasite structure.

The above zeolite product was admixed with a silica hydrogel in the ratio of 1 part zeolite to 9 parts steamed hydrogel and the resulting mixture was pelleted to form a cracking catalyst. The composite product was used in a fixed bed catalytic cracking test unit at a temperature of 960° F., atmospheric pressure, a feed rate of 0.69 w./hr./w., and a cycle time of 30 minutes, to determine its cracking activity. The feed utilized had a specific gravity of 33.3 A.P.I., a boiling range of about 500–680° F., an aniline point of 171° F., a sulfur content of 0.2 wt. percent, a bromine number of 3.0 and a pour point of 40° F.

For evaluation purposes the performance of the above catalyst was compared to that of a conventional standard silica-alumina gel catalyst containing 25 wt. percent alumina, and a conventional standard silica-magnesia gel catalyst containing 30 wt. percent magnesia. The following table shows the product distribution obtained for each catalyst at a common conversion level of 62.3%. (Conversion is expressed as a percentage of feed converted to products boiling below about 430° F.).

TABLE V.—EVALUATION OF CRACKING CATALYSTS
[Comparison of product distribution at 62.3% conversion level]

|  | Crystalline Zeolite Containing 12 Wt. Percent MgO Embedded in Silica Gel | Standard Silica-Alumina Catalyst | Standard Silica-Magnesia Catalyst |
|---|---|---|---|
| Carbon, Wt. Percent | 4.6 | 7.7 | 5.7 |
| $C_4^-$ Gas | 13.1 | 13.0 | 20.0 |
| Naphtha ($C_5$–430° F.) | 44.7 | 31.0 | 37.0 |

As shown in the above table, the MgO-containing crystalline zeolite on silica gel catalyst exhibited a lower carbon make, a lower $C_4^-$ gas make, and a correspondingly higher naphtha make than either of the conventional cracking catalysts. The beneficial effect of the inclusion of an inorganic metal oxide within the crystal framework of the zeolite is thus demonstrated in the superior cracking ability of catalysts formed from such zeolites.

Example 11

To illustrate the use of the zeolite products of the present invention in hydrocracking operations, a synthetic crystalline sodium alumino-silicate zeolite containing a minor proportion of powdered magnesium oxide within its crystal framework was prepared by the procedure of Example 1 except that the crystallization time was reduced to about 4¾ days, and the ammonium chloride base exchange treatment was performed as follows: The sodium form of the product was treated in three stages with the 19% ammonium chloride solution; the first treatment for 5 hours at room temperature, and the second and third treatments at 150° to 160° F. for 2 hours each treatment. After water washing and drying, the $Na_2O$ content had been reduced to 2.2 wt. percent.

The above zeolite product was modified to form a hydrocracking catalyst by slurrying 179 grams in 1 liter of water and adding, while stirring, 57 cc. of an ammoniacal palladium chloride complex solution (i.e. $Pd(NH_3)_4Cl_2$) containing 0.012875 gram palladium per cc. Mixing was continued for 2 hours, after which period the catalyst was filtered, water washed and dried at 212° F. The product showed the following analysis: 2.2 wt. percent $Na_2O$, 6.0 wt. percent MgO, 68.4 wt. percent $SiO_2$, 20.8 wt. percent $Al_2O_3$, and 0.5 wt. percent Pd; and exhibited a typical faujasite structure as determined by X-ray diffraction analysis.

The above hydrocracking catalyst was sized and heat-treated for evaluation in a small fixed bed testing unit. $\frac{3}{16}''$ x $\frac{3}{32}''$ pellets were formed in a pilling machine and crushed to 14–35 mesh size for testing. The heat-treatment was performed by flowing a stream of dry air over the catalyst in a muffle furnace, holding at 300° F. for 16 hours, raising the temperature slowly to 1000° F. at the rate of 100° F./hour, and holding at 1000° F. for a minimum of about 3½ hours. This latter treatment had the effect of eliminating all but traces of $NH_3$ from the catalyst (e.g. to less than 0.003% wt.).

The above-prepared catalyst was tested in the fixed bed unit together with a standard catalyst which had essentially the same composition except for exclusion of MgO.

The feed used was a light catalytic cycle oil of approximately 430 to 650° F. boiling range and contained 40 p.p.m. nitrogen. The following data on these two catalysts were obtained at a pressure of 1000 p.s.i.g., a temperature between 660° and 700° F., a feed rate of between 2.7 v./v./hr. and 4.0 v./v./hr., and a hydrogen rate of about 8000 s.c.f. per barrel of feed. The relative activities of these two catalysts were determined by comparing the percent conversion to products boiling below 430° F. (obtained from $D+L$ Engler distillation data) adjusted to reference conditions of temperature, pressure, gas rate, and feed rate by well-known correlative methods.

Under the conditions cited it was found that the two catalysts had essentially the same selectivities but that the relative activities were as follows:

TABLE VI

Standard catalyst without MgO _____ 1.00
Catalyst with MgO _____ 1.98

It is thus seen that the catalyst containing the magnesium oxide ingredient was about twice as active as the standard catalyst which did not contain MgO.

It was also found that, after 220 hours on feed, the catalyst containing magnesium oxide had accumulated only approximately one-third as much carbon as had the standard catalyst, as shown in the following table:

TABLE VII—CARBON DEPOSITION

|  | Carbon, Wt. Percent (burnable) | Hours on Feed |
|---|---|---|
| Standard catalyst without MgO | 10.94 | 220 |
| Catalyst with MgO | 3.73 | 220 |

The heat stabilites of the two catalysts at a temperature of 1520° F. were also tested. The catalyst containing the magnesium oxide ingredient retained its crystallinity to a higher degree than the standard catalyst as shown by their relative X-ray diffraction patterns. In the following table, the percent crystallinity refers to a similar standard catalyst (taken as having a crystallinity of 100) which was not subjected to extreme heat conditions.

TABLE VIII.—HEAT STABILITY AT 1520° F.

|  | Crystallinity, percent of standard |
|---|---|
| Standard catalyst without MgO | 13 |
| Catalyst with MgO | 44 |

Example 12

The synthetic faujasite product of Example 1 containing 5.85 wt. percent MgO is modified by ion exchange treatment with a 12% $MgCl_2$ solution to further increase its magnesium content. 500 gams of zeolite are slurried in 1500 cc. of solution. The liquid is decanted, and the solids are washed. After four such exchanges, the zeolite is dried at 250° F. and calcined at 850° F. On analysis, the product shows about 12% magnesium oxide.

The resulting magnesium-form zeolite is evaluated for cracking activity by contact with an East Texas light gas oil in a fixed bed unit at 850° F., atmospheric pressure, and 0.6 v./v./hr. A substantial portion of the feed is converted to lower boiling products.

It is to be understood that the present invention is not intended to be restricted to the examples set forth above, and that minor modificaions may be made without departing from the spirit of the invention.

What is claimed is:

1. A process for preparing a synehetic crystalline alumino-silicate zeolite product having improved high temperature stability, which comprises crystallizing said zeolite at an elevated temperature from an aqueous reaction mixture containing alkali metal oxide, silica, alumina, and an inorganic metal oxide capable of improving the high temperature stability of said zeolite and selected from the group consisting of oxides of rare earth metals and metals in Group II of the Periodic Table, said inorganic metal oxide being present in said reaction mixture at the time crystallization of said zeolite is initiated in an amount within the range of from about 1 to about 20 wt. percent based on the weight of said product, and recovering a crystalline zeolite product containing said inorganic metal oxide firmly held in its crystal framework.

2. The process of claim 1, wherein said zeolite is selected from the group consisting or synthetic faujasite, synthetic mordenite and "Zeolite A."

3. The process of claim 1, wherein said elevated temperature is within the range of about 180° to 250° F. and said reaction mixture is aged at said temperature for a sufficient time to crystallize said zeolite.

4. The process of claim 1, wherein said zeolite has a faujasite structure and is characterized by the following molar formula:

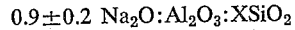

wherein X has a value of from about 2 to about 7; the molar ratios of the reactants in said reaction mixture being within the following ranges:

| | |
|---|---|
| $SiO_2/Al_2O_3$ | 3–27 |
| $Na_2O/Al_2O_3$ | 1–11 |
| $H_2O/SiO_2$ | 3–30 |

5. The process of claim 1, wherein said zeolite has a "Zeolite A" structure and is characterized by the following molar formula:

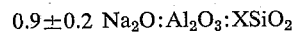

wherein X has a value of from about 1.5 to about 5; the molar ratios of the reactants in said reaction mixture being within the following ranges:

| | |
|---|---|
| $SiO_2/Al_2O_3$ | 0.5–1.3 |
| $Na_2O/Al_2O_3$ | 0.5–3.9 |
| $H_2O/SiO_2$ | 35–600 |

6. The process of claim 5, wherein said molar ratios are within the following ranges:

| | |
|---|---|
| $SiO_2/Al_2O_3$ | 1.3–2.5 |
| $Na_2O/Al_2O_3$ | 1.0–7.5 |
| $H_2O/SiO_2$ | 35–600 |

7. The process of claim 1, wherein said inorganic metal oxide is magnesium oxide.

8. The product resulting from crystallizing a synthetic alumino-silicate zeolite at an elevated temperature from an aqueous reaction mixture containing alkali metal oxide, silica, alumina, and an inorganic metal oxide capable of improving the high temperature stability of said zeolite and selected from the group consisting of oxides of rare earth metals and metals in Group II of the Periodic Table, said inorganic metal oxide being present in said reaction mixture at the time crystallization of said zeolite is initiated in an amount within the range of from about 1 to about 20 wt. percent based on the weight of said product.

9. The product of claim 8, wherein said zeolite is selected from the group consisting of synthetic faujasite, synthetic mordenite and "Zeolite A."

10. The product of claim 8, wherein the amount of said inorganic oxide is within the range of about 2 to 12 wt. percent.

11. The product of claim 10, wherein said inorganic metal oxide is selected from the group consisting of oxides of zinc, calcium, beryllium, cerium, lanthanum and magnesium.

12. The product of claim 8, wherein said zeolite has been base-exchanged with a cation to reduce its alkali metal oxide content to less than 10 wt. percent.

13. The product of claim 8 composited with a platinum group meal, said zeolite having been base-exchanged with a cation to reduce the alkali metal oxide content of the zeolite structure to less than 10 wt. percent.

14. The product of claim 12, wherein said cation is selected from the group consisting of metal cations and hydrogen-containing cations.

15. The product of claim 13, wherein said cation is selected from the group consisting of metal cations and hydrogen-containing cations.

16. The product of claim 8, wherein said inorganic metal oxide is magnesium oxide.

17. The zeolite product of claim 16, wherein said zeolite has been base-exchanged with a cation selected from the group consisting of metal cations and hydrogen-containing cations to thereby reduce the alkali metal oxide content of the zeolite structure to less than 10 wt. percent.

18. The zeolite product of claim 16 composited with a platinum group metal, said zeolite having been base-exchanged with a cation selected from the group consisting of metal cations and hydrogen-containing cations to thereby reduce the alkali metal oxide content of the zeolite structure to less than 10 wt. percent.

References Cited

UNITED STATES PATENTS

| | | | |
|---|---|---|---|
| 3,140,249 | 7/1964 | Plank et al. | 208—120 |
| 3,140,253 | 7/1964 | Plank et al. | 208—120 |
| 3,244,643 | 4/1966 | Schwartz | 208—120 |

OSCAR R. VERTIZ, *Primary Examiner.*

DELBERT E. GANTZ, MILTON WEISSMAN,
*Examiners.*

A. RIMENS, E. J. MEROS, *Assistant Examiners.*